US010462168B2

(12) United States Patent
Shibahara et al.

(10) Patent No.: US 10,462,168 B2
(45) Date of Patent: Oct. 29, 2019

(54) ACCESS CLASSIFYING DEVICE, ACCESS CLASSIFYING METHOD, AND ACCESS CLASSIFYING PROGRAM

(71) Applicant: NIPPON TELEGRAPH AND TELEPHONE CORPORATION, Chiyoda-ku (JP)

(72) Inventors: Toshiki Shibahara, Tokyo (JP); Takeshi Yagi, Tokyo (JP); Mitsuaki Akiyama, Tokyo (JP); Yuta Takata, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 149 days.

(21) Appl. No.: 15/577,938

(22) PCT Filed: May 31, 2016

(86) PCT No.: PCT/JP2016/066054
§ 371 (c)(1),
(2) Date: Nov. 29, 2017

(87) PCT Pub. No.: WO2016/194909
PCT Pub. Date: Dec. 8, 2016

(65) Prior Publication Data
US 2018/0176242 A1 Jun. 21, 2018

(30) Foreign Application Priority Data
Jun. 2, 2015 (JP) ................................. 2015-112227

(51) Int. Cl.
*G06F 15/16* (2006.01)
*G06F 17/18* (2006.01)
(Continued)

(52) U.S. Cl.
CPC .......... *H04L 63/1425* (2013.01); *G06F 16/00* (2019.01); *G06F 16/2246* (2019.01);
(Continued)

(58) Field of Classification Search
None
See application file for complete search history.

(56) References Cited

U.S. PATENT DOCUMENTS 10,015,183 B1 7/2018 Neil
2008/0320075 A1 12/2008 Livshits et al.
(Continued)

FOREIGN PATENT DOCUMENTS

JP 2000-172699 A 6/2000
JP 2010-72727 A 4/2010
(Continued)

OTHER PUBLICATIONS

International Search Report dated Aug. 9, 2016, in PCT/JP2016/066054 filed May 31, 2016.
(Continued)

*Primary Examiner* — Joseph P Hirl
*Assistant Examiner* — Kalish K Bell
(74) *Attorney, Agent, or Firm* — Oblon, McClelland, Maier & Neustadt, L.L.P.

(57) ABSTRACT

An access classifying device includes a tree building unit, a similarity-degree calculating unit, and a classifying unit. The tree building unit generates multiple trees, in which a first server and multiple second servers are nodes and commands for automatically transferring the sequence of accesses from the above-described first server to the above-described second servers are edges. The similarity-degree calculating unit calculates the degree of similarity between the above-described trees in accordance with the degree of matching between partial trees included in each of the above-de-
(Continued)

scribed trees generated. The classifying unit classifies the above-described access in accordance with the above-described degree of similarity calculated.

11 Claims, 15 Drawing Sheets

(51) Int. Cl.

| | |
|---|---|
| G06N 20/00 | (2019.01) |
| G06N 3/08 | (2006.01) |
| G06N 3/04 | (2006.01) |
| G06N 5/02 | (2006.01) |
| H04L 29/06 | (2006.01) |
| G06F 16/28 | (2019.01) |
| G06F 16/22 | (2019.01) |
| G06F 21/51 | (2013.01) |
| G06F 21/56 | (2013.01) |
| G06F 16/00 | (2019.01) |

(52) U.S. Cl.
CPC ............ *G06F 16/285* (2019.01); *G06F 21/51* (2013.01); *G06F 21/56* (2013.01); *H04L 63/1416* (2013.01)

(56) References Cited

U.S. PATENT DOCUMENTS

| | | | |
|---|---|---|---|
| 2013/0254895 | A1 | 9/2013 | Neil et al. |
| 2013/0304677 | A1* | 11/2013 | Gupta .................. G06N 5/043 706/12 |
| 2014/0068769 | A1 | 3/2014 | Neil |
| 2014/0201838 | A1* | 7/2014 | Varsanyi ............... G06F 21/552 726/23 |
| 2015/0180889 | A1* | 6/2015 | Neil .................... H04L 63/1433 726/23 |
| 2016/0277433 | A1 | 9/2016 | Neil et al. |
| 2017/0070520 | A1 | 3/2017 | Sato et al. |
| 2017/0163668 | A1 | 6/2017 | Neil et al. |
| 2018/0109544 | A1 | 4/2018 | Neil et al. |
| 2018/0278641 | A1 | 9/2018 | Neil |

FOREIGN PATENT DOCUMENTS

| | | |
|---|---|---|
| JP | 2010-122737 A | 6/2010 |
| WO | WO 2015/141665 A1 | 9/2015 |

OTHER PUBLICATIONS

Peter Likarish et al., "Obfuscated Malicious Javascript Detection using Classification Techniques", IEEE 4th International Conference on Malicious and Unwanted Software (Malware), (2009), pp. 47-54.

Charlie Curtsinger et al., "Zozzle: Fast and Precise In-Browser JavaScript Malware Detection", Usenix Security Symposium, (2011), 16 pages.

Alexandros Kapravelos et al., "Revolver: An Automated Approach to the Detection of Evasive Web-based Malware", 22nd Usenix Security Symposium, (2013), pp. 637-651 (total 16 pages).

Christian Seifert et al., "Identification of Malicious Web Pages with Static Heuristics", IEEE Telecommunication Networks and Applications Conference, (2008), pp. 91-96.

Justin MA et al., "Beyond Blacklists: Learning to Detect Malicious Web Sites from Suspicious URLs", Proceedings of the 15th ACM SIGKDD International Conference of Knowledge Discovery and Data Mining, (2009), pp. 1245-1253.

Davide Canali et al., "Prophiler: A Fast Filter for the Large-Scale Detection of Malicious Web Pages", Proceedings of the 20th International Conference on World Wide Web, (2011), pp. 197-206.

Kevin Bargolte et al., "Delta: Automatic Identification of Unknown Web-based Infection Compaigns", Proceedings of the 2013 ACM SIGSAC Conference on Computer & Communications Security, (2013), pp. 109-120.

Takashi Matsunaka et al., "An Approach to Detect Drive-by Download by Observing the Web Page Transition Behaviors", Ninth Asia Joint Conference on Information Security, (2014), pp. 19-25.

Stringhini et al., "Shady Paths: Leveraging Surfing Crowds to Detect Malicious Web Pages", Proceedings of the 2013 ACM SIGSAC Conference on Computer & Communications Security, (2013), 12 pages.

M. Zubair Rafique et al., "Network Dialog Minimization and Network Dialog Diffing: Two Novel Primitives for Network Security Applications", Proceedings of the 30th Annual Computer Security Application Conference, (2014), 10 pages.

2015/0020199 A1, Jan. 15, 2015, Neil, J. C. et al. (corresponds to U.S. Pat. No. 10,015,183 B1, US 2013/0254895 A1, US 2014/0068769 A1, US 2016/0277433 A1, US 2017/0163668 A1, US 2018/0109544 A1, US 2018/0278641 A1 and US 2015/0180889 A1).

Extended European Search Report dated Nov. 13, 2018 in European Patent Application No. 16803343.9, 6 pages.

\* cited by examiner

FIG.2

| SERIAL NUMBER | TRANSFER DESTINATION | TRANSFER SOURCE | TRANSFER COMMAND |
|---|---|---|---|
| 1 | http://foo1.example.com/index.html | http://foo.example.com/index.html | SRC-IFRAME |
| | http://foo.example.com/1.js | http://foo1.example.com/index.html | SRC-SCRIPT-SRC |
| | http://foo1.example.com/2.jar | http://foo1.example.com/index.html | SRC-APPLET-ARCHIVE |
| | http://foo.example3.com/index.php | http://foo.example2.com/index.html | HTTP302Redirect |
| 2 | http://foo.example3.com/3.js | http://foo.example3.com/index.php | SRC-SCRIPT-SRC |
| | http://foo.example3.com/abc/4.html | http://foo.example3.com/index.php | SRC-OBJECT-CODEBASE |
| ... | ... | ... | ... |

FIG.3

| SERIAL NUMBER | LABEL | TRANSFER DESTINATION | TRANSFER SOURCE | TRANSFER COMMAND |
|---|---|---|---|---|
| 1 | BENIGN | http://www1.example.com/index.html | http://www.example.com/index.html | SRC-IFRAME |
| | | http://www.example.com/1.js | http://www.example.com/index.html | SRC-SCRIPT-SRC |
| | | http://www1.example.com/2.jar | http://www1.example.com/index.html | SRC-APPLET-ARCHIVE |
| 2 | MALIG-NANT | http://www.example3.com/index.php | http://www.example2.com/index.html | HTTP302Redirect |
| | | http://www.example3.com/3.js | http://www.example3.com/index.php | SRC-SCRIPT-SRC |
| | | http://www.example3.com/abc/4.html | http://www.example3.com/index.php | SRC-OBJECT-CODEBASE |
| ... | ... | ... | ... | ... |

ACCESS CLASSIFYING DEVICE, ACCESS CLASSIFYING METHOD, AND ACCESS CLASSIFYING PROGRAM

FIELD

The present invention relates to an access classifying device, an access classifying method, and an access classifying program.

BACKGROUND

Conventionally, there are malicious website discrimination techniques that are techniques for discriminating malicious websites that cause malware infection among the websites that are accessed by user terminals. These malicious website discrimination techniques are divided into dynamic analysis and static analysis. The dynamic analysis is a technique for discriminating malicious websites by executing contents, such as HTML (HyperText Markup Language) or JavaScript (registered trademark), acquired from a server, such as a web server, and detecting attacks on vulnerability in accordance with the behavior in the host at that time. Conversely, the static analysis is a technique in which contents are only acquired from a server, code analysis is conducted on the contents, and by using information associated with the characteristics of a program, domain, or URL (Uniform Resource Locator), malicious websites are discriminated in accordance with differences from the characteristics that are observed in benign websites.

An explanation is given below of a conventional technology related to discrimination of malicious websites due to static analysis. Malicious website discrimination techniques using static analysis include a technique for making discrimination by using the characteristics of contents that are acquired from a single page and a technique for making discrimination by extracting characteristics from accesses to multiple pages, which occur due to redirect of a website. With regard to the former discrimination technique, many techniques have been proposed, which make discrimination by analyzing JavaScript (registered trademark) in contents. Among these techniques, there is a technique (non patent literature 1) in which a feature vector is described by using for example the number of lines or the number of characters in the script or the number of times that a keyword appears in the script and the technique of machine learning is used to make a discrimination. Alternatively, there is a technique (non patent literature 2) in which processing in the for sentence or the while sentence is extracted and a feature vector is generated to make a discrimination. Furthermore, there is a technique (non patent literature 3), or the like, in which a sequence is generated, which is made up of the node type of an abstract syntax tree, generated from JavaScript (registered trademark), and a discrimination is made in accordance with the degree of similarity of the sequence.

There are techniques that use HTML, URL, and information on hosts as well as JavaScript (registered trademark). For example, the techniques that use HTML include a technique (non patent literature 4) in which a discrimination is made by generating a decision tree that makes contents malicious determinations in accordance with the number of times that iframe or script tag appears, the size of a tag, or the like. Furthermore, the techniques that use URL and host information include a technique (non patent literature 5) that make URL malicious determinations by using a keyword included in a URL, DNS (Domain Name System) inquiry result, or geographical information that is associated with an IP (Internet Protocol) address. Furthermore, there is also a technique (non patent literature 6) in which classifiers are constructed, which make malicious determinations based on each piece of information of JavaScript (registered trademark), HTML, URL, and host, and determinations of the classifiers are combined to make malicious determinations of websites. Alternatively, there is a proposed technique (non patent literature 7) in which a difference is extracted from the contents that are acquired by accessing to the same page at different times and malicious determinations are made on the basis of the difference.

In addition to the above, malicious website discrimination are made by using various methods in the technique that makes discriminations on the basis of multiple times of accesses to websites triggered by redirections. For example, according to the technique (non patent literature 8) of Matsunaka, et al., the redirections triggered by attacks on vulnerability are detected on the grounds of the HTTP (Hyper Text Transfer Protocol) header at the time of download of an execution file, the contents acquired before download with no information that indicates download, or the like. Furthermore, according to the technique (non patent literature 9) by Stringhini, et al., a group of accesses with the same final page is generated from the time-series sequence of pages that are accessed by each user during automated redirection, and then a feature vector, such as the number of IP addresses or redirections, is generated from the group of accesses to discriminate a malicious website. Furthermore, according to the technique (non patent literature 10) by Rafique, et al., the part needed for download of malware is extracted from the sequence of pages that are accessed during redirection by individually accessing the pages in the sequence, and a signature is generated to discriminate a malicious website.

CITATION LIST

Non Patent Literature

Non Patent Literature 1: Peter Likarish, Eunjin Jung, and Insoon Jo., "Obfuscated Malicious JavaScript (registered trademark) Detection using Classification Techniques.", IEEE 4th International Conference on Malicious and Unwanted Software (MALWARE), 2009.

Non Patent Literature 2: Charlie Curtsinger, et al., "ZOZZLE: Fast and Precise In-Browser JavaScript (registered trademark) Malware Detection.", USENIX Security Symposium. 2011.

Non Patent Literature 3: Alexandros Kapravelos, et al., "Revolver: An Automated Approach to the Detection of Evasive Web-based Malware.", USENIX Security. 2013.

Non Patent Literature 4: Christian Seifert, Ian Welch, and Peter Komisarczuk., "Identification of Malicious Web Pages with Static Heuristics.", IEEE Telecommunication Networks and Applications Conference, 2008.

Non Patent Literature 5: Justin Ma, et al., "Beyond Blacklists: Learning to Detect Malicious WebSites from Suspicious URLs.", Proceedings of the 15th ACM SIGKDD international conference on Knowledge discovery and data mining, 2009.

Non Patent Literature 6: Davide Canali, et al., "Prophiler: A Fast Filter for the Large-Scale Detection of Malicious Web Pages.", Proceedings of the 20th international conference on World wide web, 2011.

Non Patent Literature 7: Kevin Borgolte, Christopher Kruegel, and Giovanni Vigna., "Delta: Automatic Identification of Unknown Web-based Infection Campaigns." Proceedings of the 2013 ACM SIGSAC conference on Computer & communications security, 2013.

Non Patent Literature 8: Takashi Matsunaka, Ayumu Kubota, and Takahiro Kasama., "An Approach to Detect Drive-by Download by Observing the Web Page Transition Behaviors.", Ninth Asia Joint Conference on Information Security, 2014.

Non Patent Literature 9: Gianluca Stringhini, Christopher Kruegel, and Giovanni Vigna., "Shady Paths: Leveraging Surfing Crowds to Detect Malicious Web Pages.", Proceedings of the 2013 ACM SIGSAC conference on Computer & communications security, 2013.

Non Patent Literature 10: M. Zubair Rafique, et al., "Network Dialog Minimization and Network Dialog Diffing: Two Novel Primitives for Network Security Applications.", Proceedings of the 30th Annual Computer Security Applications Conference, 2014.

SUMMARY

Technical Problem

However, according to the above-described malicious website discrimination technique based on contents, the information on contents that are acquired from a server, or the information on the URL and the host is used; therefore, attackers easily make avoidance. For example, an attacker changes the tendency of a function of HTML tag or JavaScript (registered trademark), used in a malicious website, such that it becomes close to a benign site; thus, the site, which is an originally malicious website, is sometimes mistakenly discriminated as a benign website. As a result, a problem may occur in that the malicious website, which has not been detected, cannot listed on the black list, and user's access to a malicious website is allowed. Furthermore, according to the above-described technique that is focused on redirection, multiple times of accesses are required, and malicious websites cannot be discriminated during a one-time access; therefore, the application range of the technique is limited. Therefore, there is a demand to develop malicious website discrimination techniques that make it possible to make discrimination during a one-time access without being likely to be affected by changes in contents, or the like, by attackers.

The disclosed embodiment has been made in consideration of the foregoing, and it has an object to provide an access classifying device, an access classifying method, and an access classifying program that make it possible to easily detect malicious websites with difficulty in attacker's avoidance.

Solution to Problem

An access classifying device includes: a generating unit that generates multiple trees, in which a first server and a second server are nodes and a command for transferring an access from the first server to the second server is an edge; a calculating unit that calculates a degree of similarity between the trees in accordance with a degree of matching between partial trees included in each of the trees generated; and a classifying unit that classifies the access in accordance with the degree of similarity calculated.

An access classifying method includes: a generating step of generating multiple trees, in which a first server and a second server are nodes and a command for transferring an access from the first server to the second server is an edge; a calculating step of calculating a degree of similarity between the trees in accordance with a degree of matching between partial trees included in each of the trees generated; and a classifying step of classifying the access in accordance with the degree of similarity calculated.

An access classifying program causing a computer to execute: a generating step of generating multiple trees, in which a first server and a second server are nodes and a command for transferring an access from the first server to the second server is an edge; a calculating step of calculating a degree of similarity between the trees in accordance with a degree of matching between partial trees included in each of the trees generated; and a classifying step of classifying the access in accordance with the degree of similarity calculated.

Advantageous Effects of Invention

An access classifying device, an access classifying method, and an access classifying program, disclosed in the subject application, produce advantages such that it is possible to easily detect malicious websites with difficulty in attacker's avoidance.

BRIEF DESCRIPTION OF DRAWINGS

FIG. 2 is a diagram that illustrates an example of an analysis-target access that is input to the access classifying device.

FIG. 3 is a diagram that illustrates an example of a known access that is input to the access classifying device.

DESCRIPTION OF EMBODIMENTS

With reference to the drawings, a detailed explanation is given below of an embodiment of an access classifying device, an access classifying method, and an access classifying program, disclosed in the subject application. Furthermore, the access classifying device, the access classifying method, and the access classifying program, disclosed in the subject application, are not limited to the following embodiment.

Figure 1:
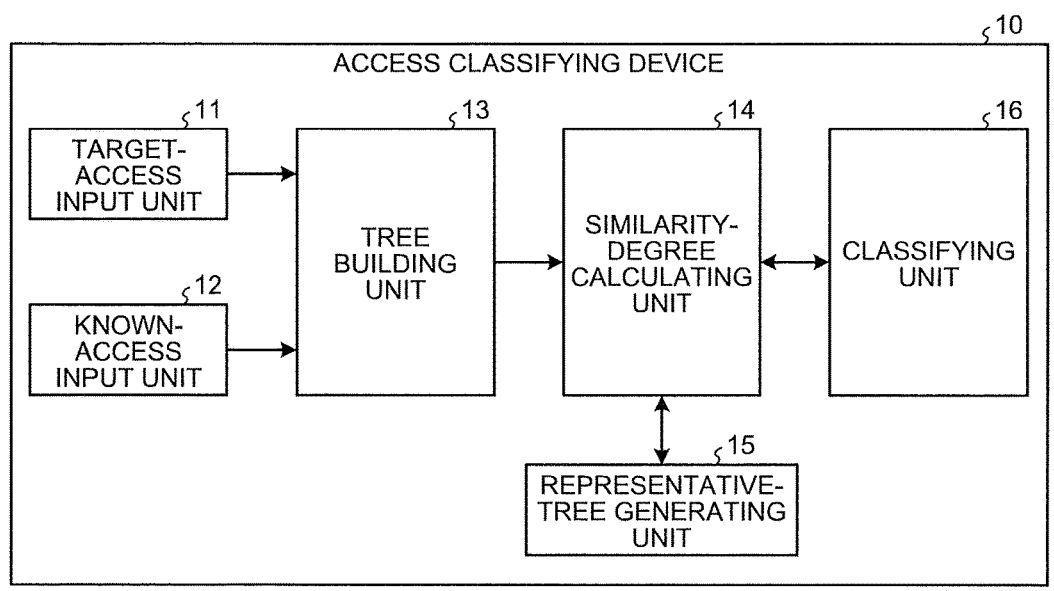
FIG. 1 is a diagram that illustrates a configuration of an access classifying device.

First, an explanation is given of the configuration of an access classifying device 10 according to an embodiment, disclosed in the subject application. FIG. 1 is a diagram that illustrates a configuration of the access classifying device 10. As illustrated in FIG. 1, the access classifying device 10 includes a target-access input unit 11, a known-access input unit 12, a tree building unit 13, a similarity-degree calculating unit 14, a representative-tree generating unit 15, and a classifying unit 16. Each of the components is connected such that it may input/output various types of signals or data in one direction or in both directions.

The target-access input unit 11 allows for accesses to the analysis-target server as inputs. The known-access input unit 12 allows for known malicious accesses, which are known as accesses to the server that provides a malicious website, and, to the contrary, known benign accesses, which are known as accesses to the server that provides a benign website, as inputs. In accordance with each of the accesses that are input by the target-access input unit 11 and the known-access input unit 12, the tree building unit 13 builds a tree where the servers at the access source (automated transfer source) and at the access destination (automated transfer destination) for the analysis-target server are "nodes" and the automated transfer command is "edge". The similarity-degree calculating unit 14 calculates the degree of similarity between trees on the basis of the degree of matching between a partial tree of the tree, built by the tree building unit 13, and a partial tree that is generated as a representative tree by the representative-tree generating unit 15. Furthermore, the similarity-degree calculating unit 14 calculates the degree of similarity between the trees that are generated by the tree building unit 13. The representative-tree generating unit 15 generates a partial tree, which is common to the tree in each group obtained by dividing the accesses, input by the known-access input unit 12, into multiple groups on the basis of the above-described degree of similarity, calculated by the similarity-degree calculating unit 14, as a representative tree. The classifying unit 16 uses the degree of similarity, calculated by the similarity-degree calculating unit 14, to determine whether the access, input by the target-access input unit 11, is an access to a malicious website.

FIG. 2 is a diagram that illustrates an example of an analysis-target access 11a that is input to the access classifying device 10. As illustrated in FIG. 2, there are URLs as the transfer destination and the transfer source of the analysis-target access 11a; however, these are not limitations, and they may be for example FQDN (Fully Qualified Domain Name), domain, or host name. Furthermore, with regard to the transfer command, as illustrated in FIG. 2, they are "SRC-IFRAME", which represents the link with the iframe tag that is an HTML tag, "SRC-SCRIPT-SRC", which represents the link with the Script tag that is an HTML tag, or the like; however, these are not limitations. For example, they may be "SRC-APPLET-ARCHIVE", which represents the link with the Applet tag that is an HTML tag, "HTTP302Redirect", which represents transfer by HTTP, "SRC-OBJECT-CODEBASE", which represents the link with the Object tag that is an HTML tag, or the like.

FIG. 3 is a diagram that illustrates an example of a known access 12a that is input to the access classifying device 10.

As illustrated in FIG. 3, there are URLs as the transfer destination and the transfer source of the known access 12a, however, these are not limitations, and they may be for example FQDN, domain, or host name. Furthermore, with regard to the transfer command, as illustrated in FIG. 3, they are the above-described "SRC-IFRAME", "SRC-SCRIPT-SRC", or the like; however, these are not limitations. The known access 12a is attached with a label for identifying the property of a website at the transfer destination, or the like, and the label is not limited to "benign" or "malicious", illustrated in FIG. 3, and it may be "advertisement", "Drive-by-Download", "Phishing", or the like.

Figure 4:
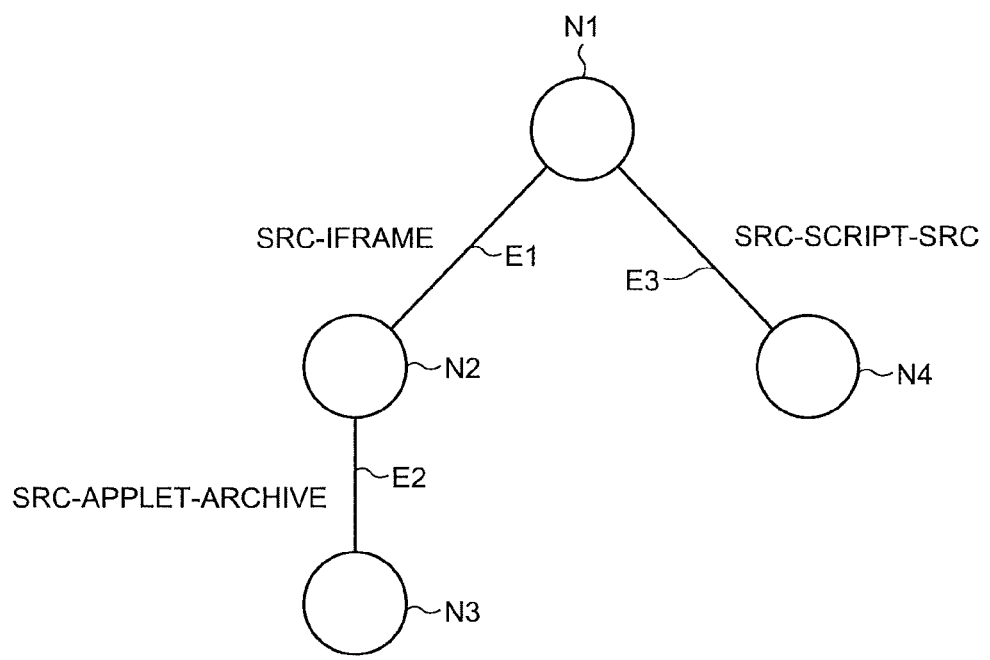
FIG. 4 is a diagram that illustrates a structure of the tree that is built by the access classifying device.

FIG. 4 is a diagram that illustrates a structure of the tree that is built by the access classifying device 10. As illustrated in FIG. 4, on the basis of the access transfer information that is illustrated in FIG. 2 and FIG. 3, the tree building unit 13 of the access classifying device 10 builds a tree where the transfer source and the transfer destination are "nodes" and the transfer command is "edge". For example, the tree building unit 13 sets the URLs of the websites as nodes N1 to N4 and generates edges E1 to E3, which correspond to transfer commands between the URLs, in the intervals between the transfer source URL and the transfer destination URL. After generation of the edges E1 to E3 is completed, the tree building unit 13 removes the information on the URL, which is attached with each of the nodes N1 to N4. Thus, it is possible to discriminate websites by focusing attention on the redirect structure without dependence on URLs. Here, in an example illustrated in FIG. 4, the URLs, temporarily attached with the nodes N1 to N4, are removed; however, URLs do not need to be removed.

Next, an operation of the access classifying device 10 is explained.

Figure 5:
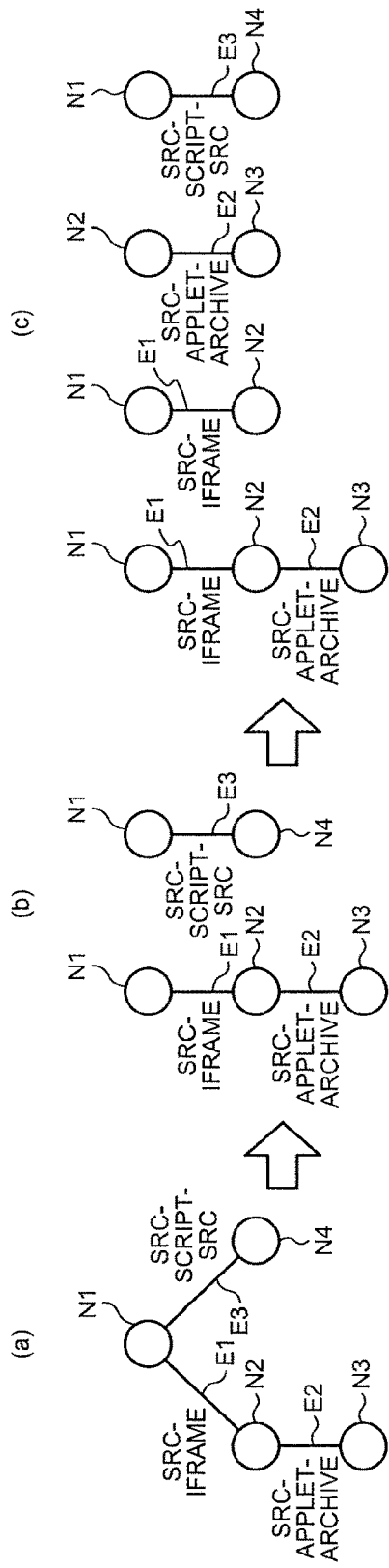
FIG. 5 is a diagram that illustrates the process to extract partial trees from a tree.

FIG. 5 is a diagram that illustrates the process to extract partial trees from a tree. As illustrated in FIG. 5, the tree building unit 13 of the access classifying device 10 extracts partial trees, included in the tree, from the built tree (see FIG. 4). For example, as illustrated in FIG. 5(a), the tree building unit 13 extracts the paths from the node N1, which corresponds to the first accessed server among the sequence of accesses, to the other end nodes N3, N4. Next, as illustrated in FIG. 5(b), the tree building unit 13 extracts all the partial paths that are included in the paths. Then, as illustrated in FIG. 5(c), the tree building unit 13 resolves the extracted partial path into partial trees. Here, if there are overlapped partial trees, the tree building unit 13 may delete one of the overlapped partial trees.

Figure 6:
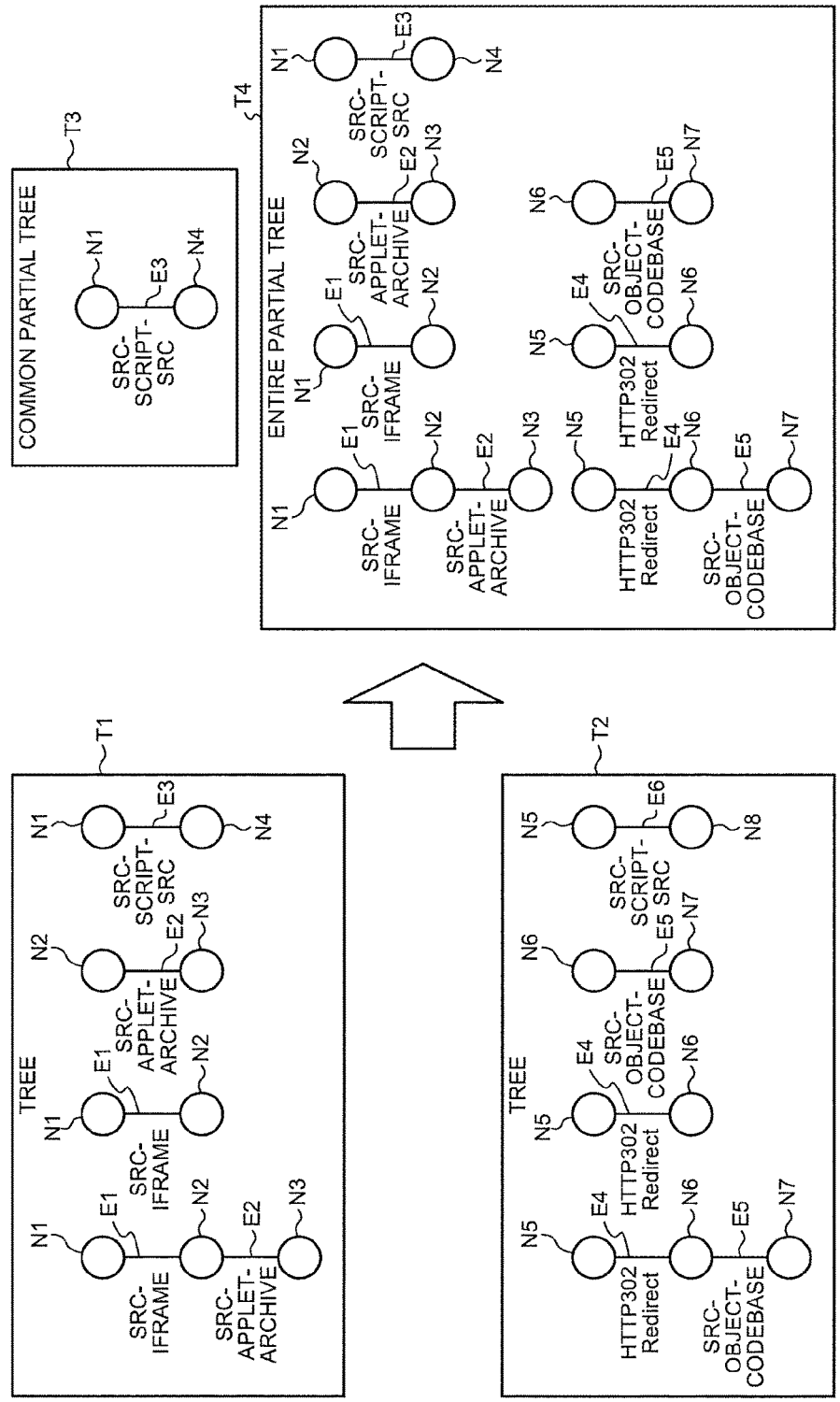
FIG. 6 is a diagram that illustrates a method for calculating the degree of similarity between trees on the basis of the percentage of common partial trees.

FIG. 6 is a diagram that illustrates a method for calculating the degree of similarity between trees on the basis of the percentage of common partial trees T3. As illustrated in FIG. 6, the similarity-degree calculating unit 14 calculates the degree of similarity between trees on the basis of the extracted partial tree (see FIG. 5(c)). First, the similarity-degree calculating unit 14 sets a group of partial trees included in a percentage of trees, which is equal to or more than a threshold (e.g., about 40 to 60%), among the trees that are targets for comparison as a common partial tree. Next, the similarity-degree calculating unit 14 sets a group of partial trees, in which the overlapped partial trees have been removed from the partial trees of all the trees that are targets for comparison, as an entire partial tree. Then, the similarity-degree calculating unit 14 divides the number of common partial trees by the number of entire partial trees to obtain a value as the degree of similarity.

For example, in the example illustrated in FIG. 6, among trees T1, T2 that are targets for comparison, the similarity-degree calculating unit 14 sets the partial tree (N1-E3-N4), included in both (equal to or more than the threshold) the trees T1, T2, as the common partial tree T3. Next, the similarity-degree calculating unit 14 sets the group of partial trees, in which the overlapped partial tree (N5-E6-N8) has been removed from the partial trees of all the trees T1, T2 that are targets for comparison, as an entire partial tree T4. Then, the similarity-degree calculating unit 14 divides "1", which is the number of the common partial trees T3, by "7", which is the number of the entire partial trees T4 to obtain a value as the degree of similarity. Therefore, in the example illustrated in FIG. 6, the degree of similarity is "1/7".

Furthermore, in the case of the configuration where the URL information, attached with the nodes N1 to N8, is not removed, the similarity-degree calculating unit 14 may make match/mismatch determination to extract the common partial tree T3 or remove an overlapped partial tree by including not only transfer commands but also URL information. Furthermore, when the entire partial tree T4 is generated, overlapped partial trees may not be removed. Furthermore, the number of trees that are targets for comparison is not limited to 2, but it is appropriate if it is equal to or more than 2. Furthermore, with regard to the parameter that is used to calculate the degree of similarity, although the percentage of the number of common partial trees to the number of entire partial trees is illustrated, it is appropriate if the number of common partial trees and the number of entire partial trees are compared, such as the percentage or the difference after weights are appropriately applied.

Figure 7:
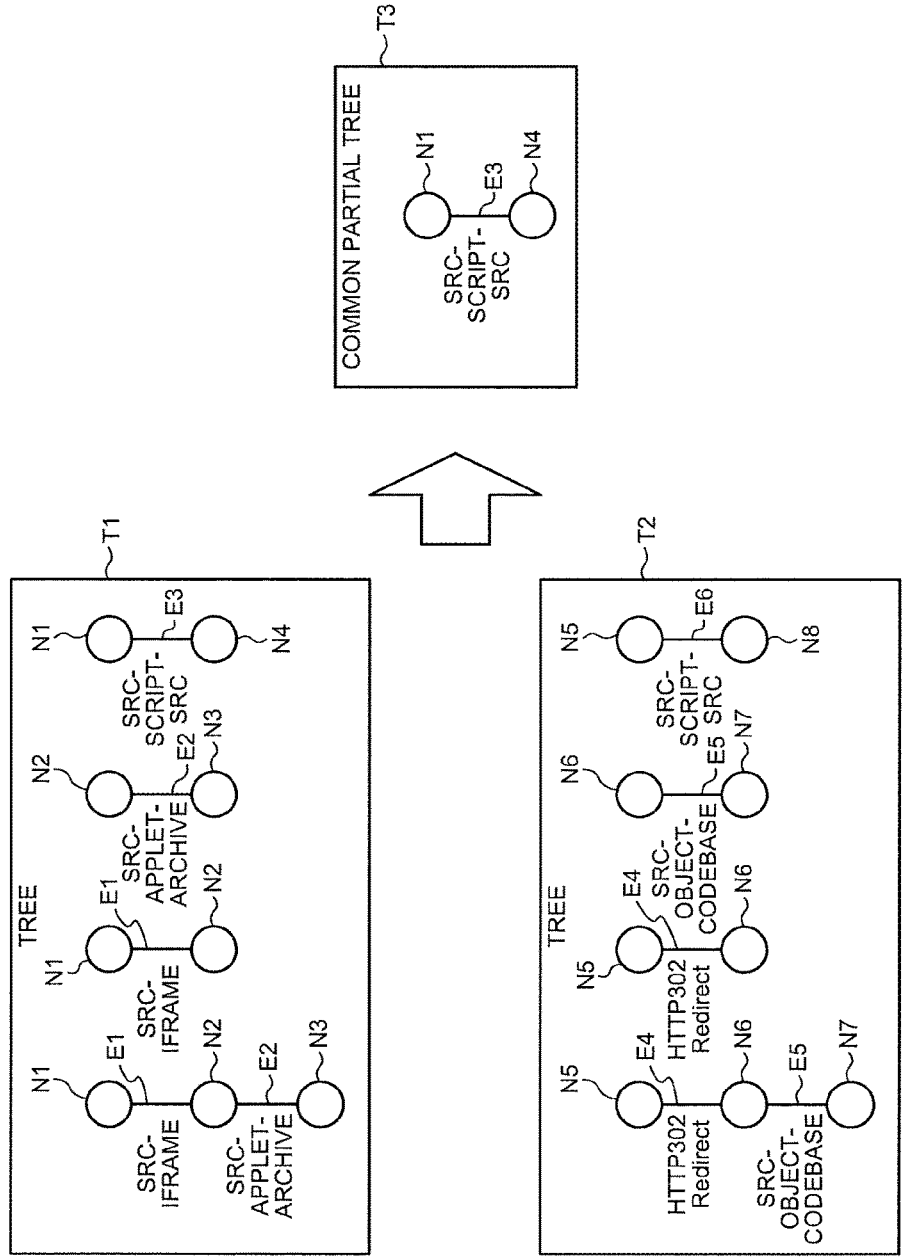
FIG. 7 is a diagram that illustrates a method for calculating the degree of similarity between trees on the basis of the number of the common partial trees.

FIG. 7 is a diagram that illustrates a method for calculating the degree of similarity between trees on the basis of the number of the common partial trees T3. As illustrated in FIG. 7, the similarity-degree calculating unit 14 calculates the degree of similarity between trees in accordance with the extracted partial trees (see FIG. 5(c)). First, the similarity-degree calculating unit 14 sets the group of partial trees, included in all the trees among the trees that are targets for comparison, as common partial trees. Then, the similarity-degree calculating unit 14 counts the number of common partial trees to obtain a value as the degree of similarity.

For example, in the example illustrated in FIG. 7, among the trees T1, T2 that are targets for comparison, the similarity-degree calculating unit 14 sets the partial tree (N1-E3-N4) included in both (all) the trees T1, T2 as the common partial tree T3. Then, the similarity-degree calculating unit 14 sets "1", which is the number of the common partial trees T3, as the degree of similarity. Therefore, in the example illustrated in FIG. 7, the degree of similarity is "1".

Furthermore, in the case of the configuration where the URL information, attached with the nodes N1 to N8, is not removed, the similarity-degree calculating unit 14 may make match/mismatch determination to extract the common partial tree T3 by including not only transfer commands but also URL information. Furthermore, the number of trees that are targets for comparison is not limited to 2, but it is appropriate if it is equal to or more than 2. Furthermore, with regard to the parameter that is used to calculate the degree of similarity, although the number of common partial trees is illustrated, it may not always be the number of common partial trees itself; for example, it is appropriate if it is based on the number of common partial trees, such as the number of nodes, the number of edges, or the like, included in a common partial tree.

Figure 8:
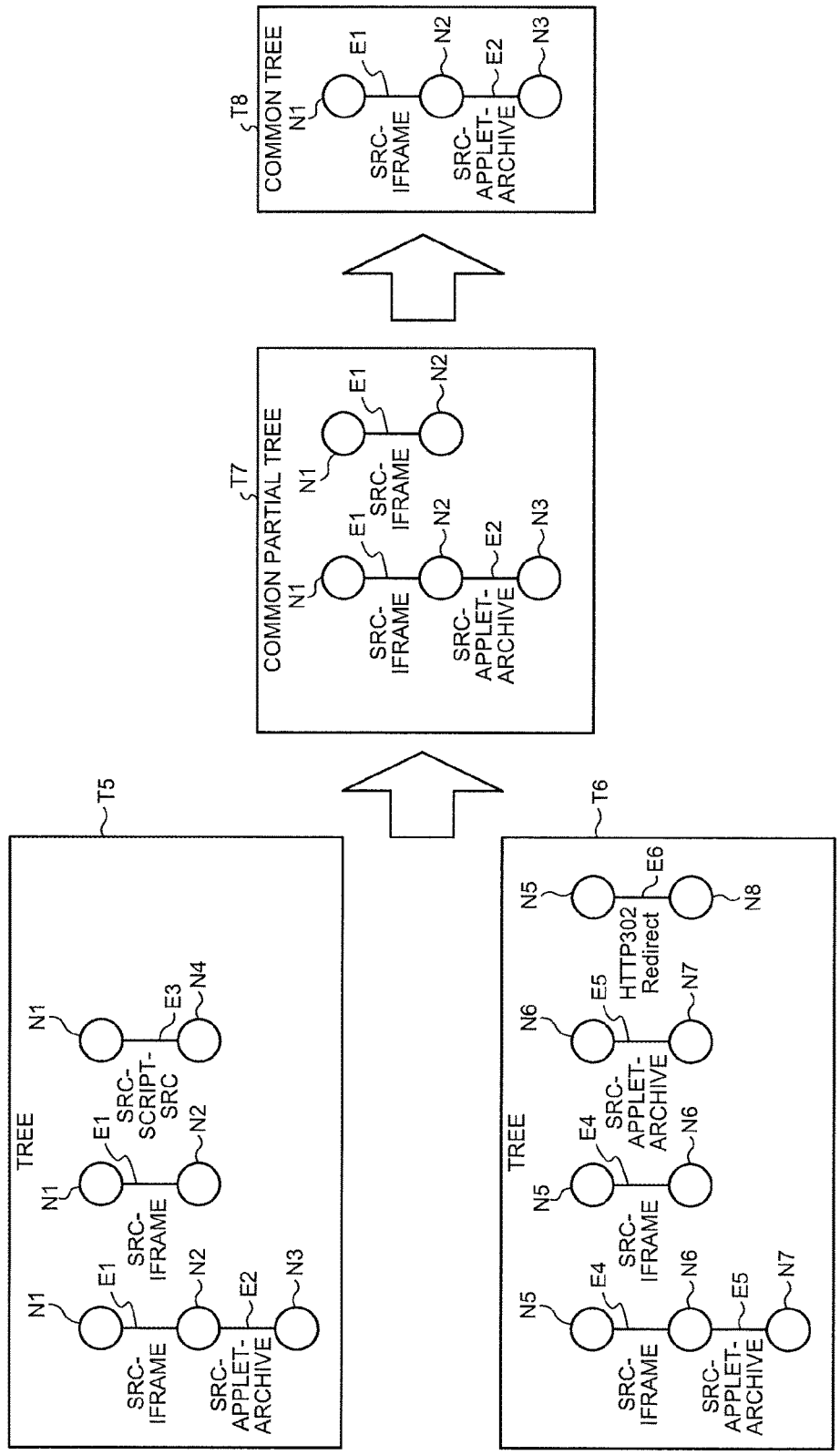
FIG. 8 is a diagram that illustrates a method for calculating the degree of similarity between trees on the basis of the size of a common tree.

FIG. 8 is a diagram that illustrates a method for calculating the degree of similarity between trees on the basis of the size of a common tree T8. As illustrated in FIG. 8, the similarity-degree calculating unit 14 calculates the degree of similarity between trees on the basis of the extracted tree (see FIG. 4). First, the similarity-degree calculating unit 14 extracts partial trees that are common to trees. Next, the similarity-degree calculating unit 14 extracts, as a "common tree", the common partial tree that has the largest number of nodes from the extracted common partial trees. Then, the similarity-degree calculating unit 14 counts the number of nodes of the extracted common tree to obtain a value as the degree of similarity.

For example, in the example illustrated in FIG. 8, from trees T5, T6, which are targets for comparison, the similarity-degree calculating unit 14 extracts partial trees (N1-E1-N2-E2-N3, N1-E1-N2) that are common to both the trees T5, T6 to obtain common partial trees T7. Next, the similarity-degree calculating unit 14 extracts the common partial tree (N1-E1-N2-E2-N3), which has the largest number of nodes "3", from the common partial trees T7 to obtain the common tree T8. Then, the similarity-degree calculating unit 14 determines that the degree of similarity is "3", which is the number of nodes of the common tree T8. Therefore, in the example illustrated in FIG. 8, the degree of similarity is "3".

Furthermore, in the case of the configuration where the URL information, attached with the nodes N1 to N8, are not removed, the similarity-degree calculating unit 14 may make match/mismatch determination to extract the common partial tree T7 by including not only transfer commands but also URL information. Furthermore, the number of trees that are targets for comparison is not limited to 2, but it is appropriate if it is equal to or more than 2. Furthermore, with regard to the parameter that is used to calculate the degree of similarity, although the number of nodes of common trees is illustrated, it is appropriate if it is related to the size of a common tree, such as the number of edges of a common tree.

Figure 9:
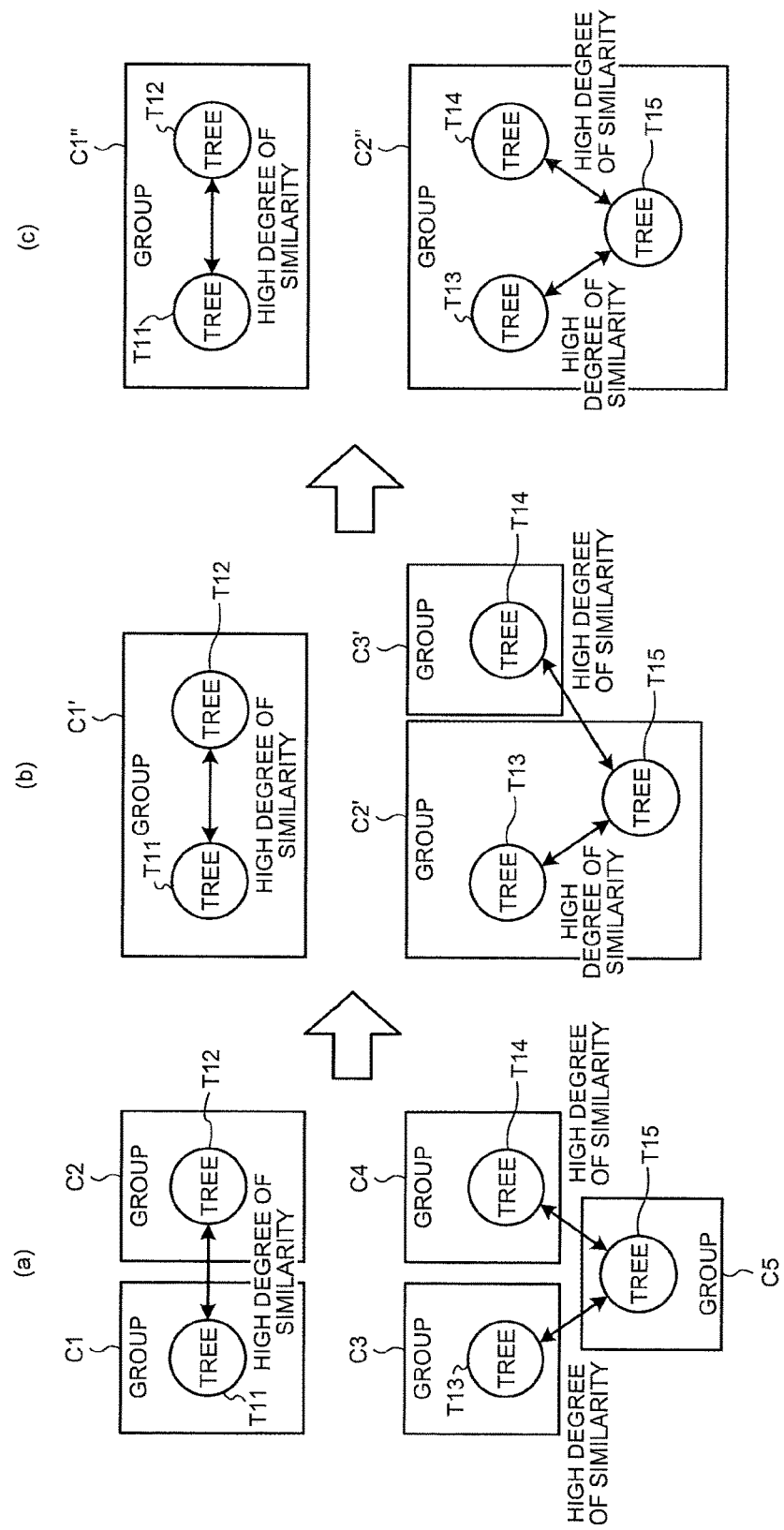
FIG. 9 is a diagram that illustrates a method for classifying multiple trees into groups.

FIG. 9 is a diagram that illustrates a method for classifying multiple trees into groups. As illustrated in FIG. 9, in the access classifying device 10, the classifying unit 16 classifies trees (accesses), illustrated in FIG. 4, into groups that are made up of trees with a high degree of similarity. In a state where each group is made up of only one tree, the classifying unit 16 combines the groups if the largest value of the above-described degree of similarity between trees, which belong to the respective groups, is equal to or more than a threshold. The classifying unit 16 repeatedly performs this combining process until there are no more groups to be combined.

For example, in the example illustrated in FIG. 9(a), each group C1 to C5 is made up of only one tree (trees T11 to T15). The classifying unit 16 classifies the trees T11 to T15 into groups C1' to C3', which are made up of trees with a high degree of similarity. In the example illustrated in FIG. 9(b), the group C1 and the group C2 are combined, to which the tree T11 and the tree T12 with the maximal value of the degree of similarity equal to or more than the threshold belong, so that they are classified into the same group C1'. In the same manner, the group C3 and the group C5 are combined, to which the tree T13 and the tree T15 with the maximal value of the degree of similarity equal to or more than the threshold belong, so that they are classified into the same group C2'. This combining process is repeatedly performed so that, as illustrated in FIG. 9(c), with regard to all the trees T11, T12 that belong to a group C1", the maximal value of the degree of similarity with a different tree, which belongs to the same group C1", is equal to or more than the threshold. Similarly, with regard to all the trees T13 to T15 that belong to a group C2", the maximal value of the degree of similarity with a different tree, which belongs to the same group C2", is equal to or more than the threshold. Thus, it is possible to make a classification into groups (the group C1" and the group C2") that are made up of trees (the trees T11, T12 and the trees T13 to T15) with a high degree of similarity.

Furthermore, as the reference for combining groups, the classifying unit 16 uses the maximal value of the degree of similarity; however, this is not a limitation, and the minimum value or the average value of the degree of similarity may be used. If the maximal value of the degree of similarity is used, a group of trees is generated, in which a part of partial trees, commonly included in trees, are common; however, if the minimum value of the degree of similarity is used instead of the maximal value, the classifying unit 16 may generate a group of trees in which many partial trees are common. Furthermore, if the average value is used, the classifying unit 16 may generate a group of trees that are intermediate between them. Furthermore, the threshold is set as the reference for combining groups; however, without setting the threshold, the classifying unit 16 may preferentially combine groups with the largest degree of similarity, repeat the combining process until they become one group as a whole, and then determine any stage to be used in the process of combining the groups. Furthermore, the number of groups, which are targets for combining, is not limited to 2, but it is appropriate if it is equal to or more than 2.

Figure 10:
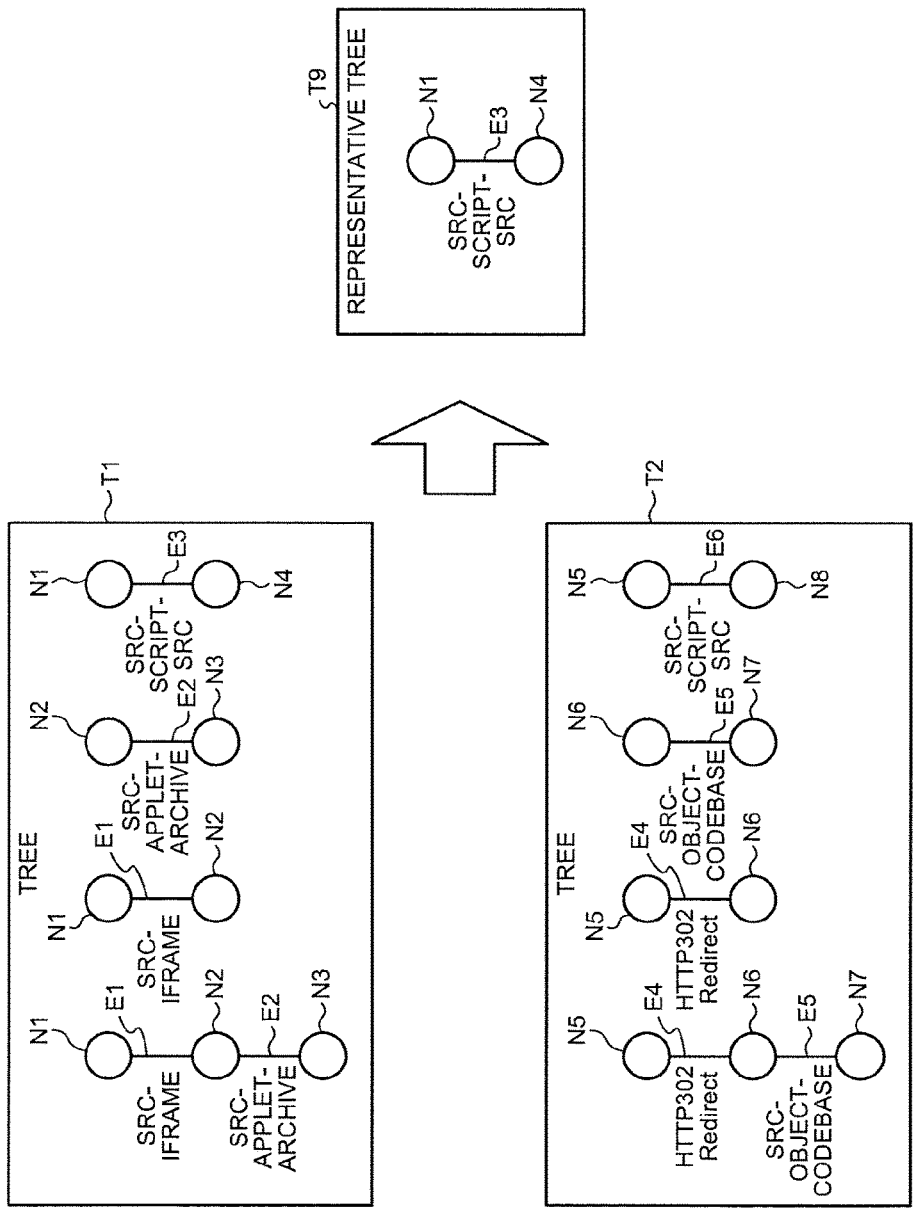
FIG. 10 is a diagram that illustrates a method for generating a representative tree from a group of trees.

FIG. 10 is a diagram that illustrates a method for generating a representative tree from a group of trees. As illustrated in FIG. 10, in the access classifying device 10, the representative-tree generating unit 15 generates a representative tree from the group (see FIG. 9) of trees, classified by the classifying unit 16, on the basis of the partial tree (see FIG. 5) that is extracted by the tree building unit 13. For example, the representative-tree generating unit 15 sets the partial tree, which is common to all the trees in the group, as a representative tree. In the example illustrated in FIG. 10, the representative-tree generating unit 15 sets the partial tree (N1-E3-N4), which is common to the trees T1, T2 in the same group, as a representative tree T9.

Here, the representative-tree generating unit 15 sets the partial tree, which is common to all the trees in a group, as a representative tree; however, this is not a limitation, and a representative tree may be a group of partial trees that are included in equal to or more than a predetermined percentage of trees in a group. Furthermore, in the case of the configuration where the URL information, attached with the nodes N1 to N8, is not removed, the representative-tree generating unit 15 may make match/mismatch determination to generate the representative tree T9 by including not only transfer commands but also URL information. Furthermore, the number of trees that are targets for comparison is not limited to 2, but it is appropriate if it is equal to or more than 2.

Next, with reference to FIG. 11 to FIG. 14, an operation of the access classifying device 10 is explained in detail.

Figure 11:
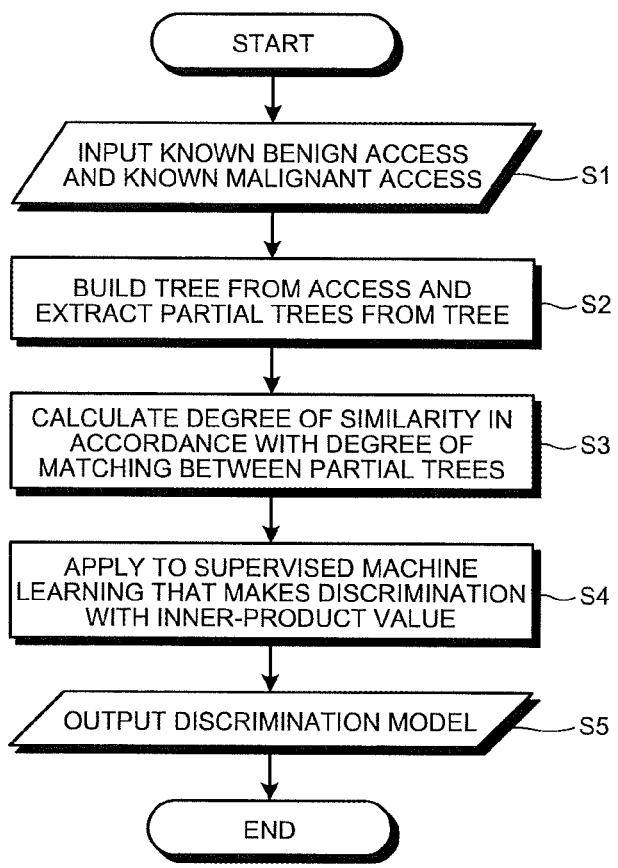
FIG. 11 is a flowchart that illustrates a discrimination-model generation process in a case where the degree of similarity is used as an inner-product value.

FIG. 11 is a flowchart that illustrates a discrimination-model generation process in a case where the degree of similarity is used as an inner-product value. At S1, the known-access input unit 12 inputs a known benign access and a known malicious access (see FIG. 3). At S2, the tree building unit 13 builds a tree from the input access and extracts partial trees from the built tree (see FIG. 4, FIG. 5). At S3, the similarity-degree calculating unit 14 calculates the degree of similarity between trees in accordance with the degree of matching between the extracted partial trees (see FIG. 6 to FIG. 8).

At S4, the classifying unit 16 applies the access, input at S1, and the degree of similarity, calculated at S3, to supervised machine learning that uses an inner-product value after conversion of input into a higher-dimensional space. Specifically, the classifying unit 16 generates a discrimination model through supervised machine learning in which the known benign access and the known malicious access, input at S1, are "training data" and the degree of similarity, calculated at S3, is an "inner-product value" after the training data is converted into a vector in a feature value space. Furthermore, the technique of the supervised machine learning is, for example, support vector machine; however this is not a limitation. At S5, the classifying unit 16 outputs the generated discrimination model to a hard disk drive 108 that is described later. The output discrimination model is stored as data in the hard disk drive 108.

Figure 12:
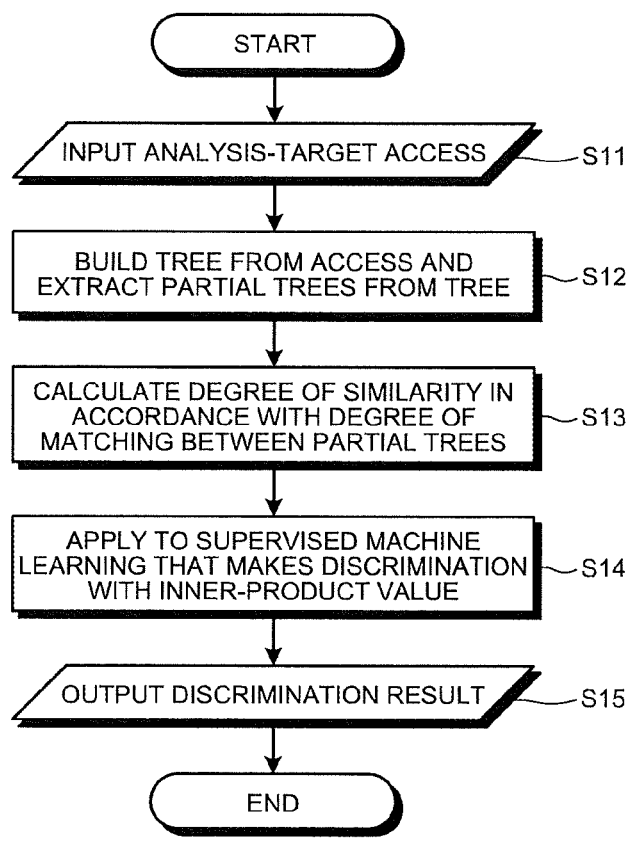
FIG. 12 is a flowchart that illustrates an access discrimination process in a case where the degree of similarity is used as an inner-product value.

FIG. 12 is a flowchart that illustrates an access discrimination process in a case where the degree of similarity is used as an inner-product value. At S11, the target-access input unit 11 inputs an analysis-target access (see FIG. 2). At S12, the tree building unit 13 builds a tree from the input access and extracts partial trees from the built tree (see FIG. 4, FIG. 5). At S13, the similarity-degree calculating unit 14 calculates the degree of similarity between trees in accordance with the degree of matching between the extracted partial trees (see FIG. 6 to FIG. 8).

At S14, the classifying unit 16 applies the access, input at S11, and the degree of similarity, calculated at S13, to supervised machine learning that uses an inner-product value after conversion of input into a higher-dimensional space. Specifically, the classifying unit 16 generates a discrimination result through the supervised machine learning in which the analysis-target access, input at S11, is "test data" and the degree of similarity, calculated at S13, is the "inner-product value" after the test data is converted into a vector in a feature value space. Furthermore, the technique of the supervised machine learning is, for example, support vector machine; however, this is not a limitation, and it may be the same technique as that is used during the above-described discrimination-model generation process. At S15, the classifying unit 16 outputs the generated discrimination result to a display device, such as a display 112 that is described later.

Figure 13:
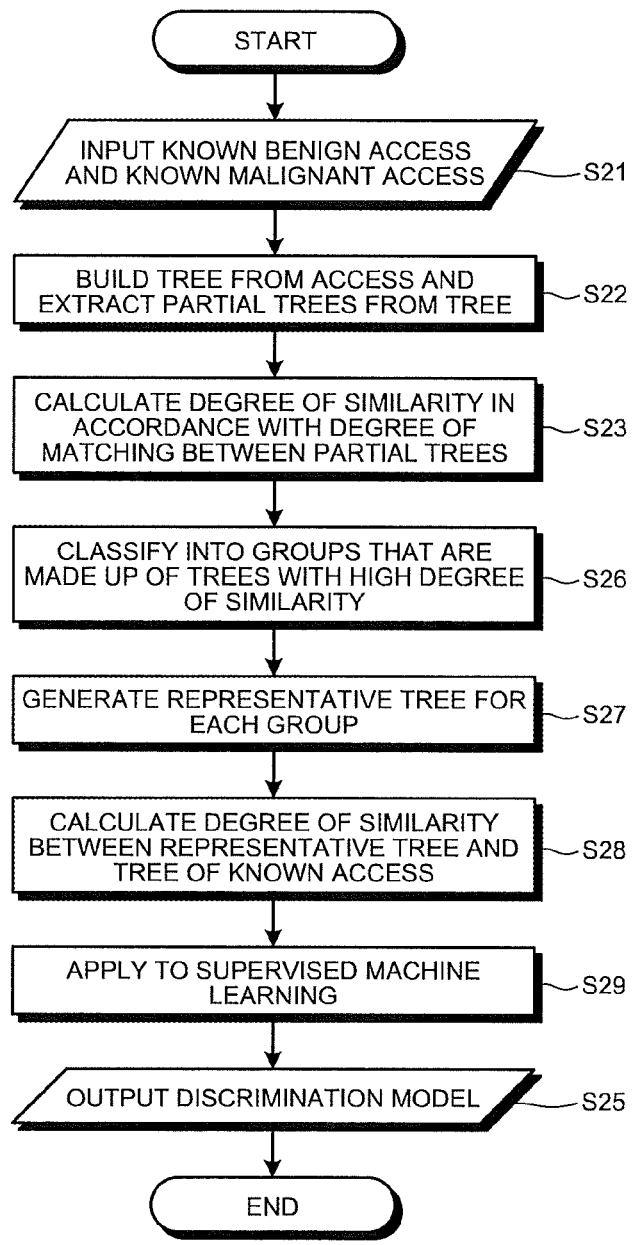
FIG. 13 is a flowchart that illustrates a discrimination-model generation process in a case where the degree of similarity with a representative tree is used.

FIG. 13 is a flowchart that illustrates a discrimination-model generation process in a case where the degree of similarity with a representative tree is used. As FIG. 13 includes the same steps as those in FIG. 11, the same steps are attached with the reference numerals that have the same last number, and their detailed explanations are omitted. Specifically, each operation at Steps S21 to S23, S25 in FIG. 13 corresponds to each operation at Steps S1 to S3, S5, illustrated in FIG. 11.

At S26, the classifying unit 16 classifies the trees, built at S22, into groups that are made up of trees with a high degree of similarity in accordance with the degree of similarity that is calculated at S23 (see FIG. 9). At S27, the representative-tree generating unit 15 generates a partial tree (e.g., a common partial tree in the same group), which represents characteristics of each group, as a representative tree for each of the groups that are obtained during classification at S26 (see FIG. 10).

At S28, by using the method that is illustrated in any of FIG. 6 to FIG. 8, the similarity-degree calculating unit 14 calculates the degree of similarity between the representative tree, generated at S27, and the tree (including a partial tree) that is generated from the known benign access or the known malicious access that is input at S21 (see FIG. 6 to FIG. 8). At S29, the classifying unit 16 applies the access, input at S21, and the degree of similarity, calculated at S23, to supervised machine learning. Specifically, the classifying unit 16 generates a discrimination model through supervised machine learning that uses the vector, in which the degree of similarity with the above-described representative tree is arranged, as the feature vector of the above-described access. Here, the technique of the supervised machine learning is, for example, linear discriminant analysis, support vector machine, or random forest; however, these techniques are not limitations.

Figure 14:
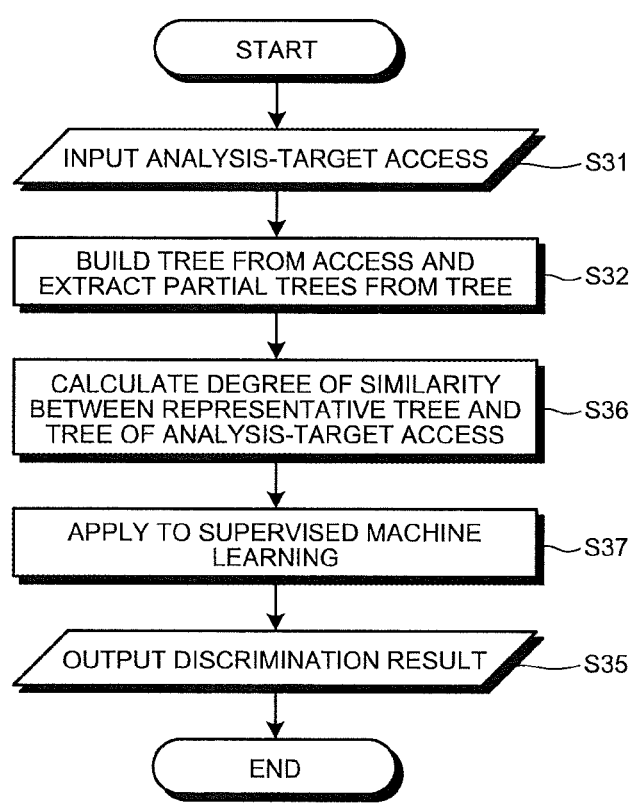
FIG. 14 is a flowchart that illustrates an access discrimination process in a case where the degree of similarity with a representative tree is used.

FIG. 14 is a flowchart that illustrates an access discrimination process in a case where the degree of similarity with a representative tree is used. As FIG. 14 includes the same steps as those in FIG. 12, the same steps are attached with the reference numerals that have the same last number, and their detailed explanations are omitted. Specifically, each operation at Steps S31, S32, S35 in FIG. 14 corresponds to each operation at Steps S11, S12, S15, illustrated in FIG. 12.

At S36, by using the method that is illustrated in any of FIG. 6 to FIG. 8, the similarity-degree calculating unit 14 calculates the degree of similarity between the representative tree, generated at S27, and the tree (including a partial tree) that is generated from the analysis-target access that is input at S31 (see FIG. 6 to FIG. 8). At S37, the classifying unit 16 applies the access, input at S31, and the degree of similarity, calculated at S36, to supervised machine learning. Specifically, the classifying unit 16 generates a discrimination result through supervised machine learning that uses the vector, in which the degree of similarity with the above-described representative tree is arranged, as the feature vector of the above-described access. Here, the technique of the supervised machine learning is, for example, linear discriminant analysis, support vector machine, or random forest; however, these techniques are not limitations, and it may be the same technique as those used during the above-described discrimination-model generation process.

As described above, the access classifying device 10 includes the tree building unit 13, the similarity-degree calculating unit 14, and the classifying unit 16. The tree building unit 13 generates multiple trees that represent a first server (e.g., a web server) and multiple second servers (e.g., servers of malicious website) as nodes and commands for automatically transferring a sequence of accesses from the above-described first server to the above-described second servers as edges. The similarity-degree calculating unit 14 calculates the degree of similarity between the above-described trees in accordance with the degree of matching between partial trees that are included in each of the above-described generated trees. The classifying unit 16 classifies the above-described access on the basis of the above-described calculated degree of similarity.

For example, in the access classifying device 10, the similarity-degree calculating unit 14 calculates, as the above-described degree of similarity, the percentage of the number of partial trees (common partial trees), which are common to the above-described trees, to the number of all the partial trees (entire partial trees) that are included in the above-described trees. Furthermore, the similarity-degree calculating unit 14 may calculate, as the above-described degree of similarity, the number of partial trees (common partial trees) that are common to the above-described trees. Alternatively, the similarity-degree calculating unit 14 may calculate, as the above-described degree of similarity, the number of nodes of the partial tree (common tree), which has the largest number of nodes, among the partial trees (common partial trees) that are common to the above-described trees. Furthermore, the classifying unit 16 may use the above-described degree of similarity to calculate an inner-product value in a space of feature values of the above-described trees so as to classify the above-described accesses.

Furthermore, the access classifying device 10 includes the tree building unit 13, the similarity-degree calculating unit 14, the classifying unit 16, and the representative-tree generating unit 15. The tree building unit 13 generates multiple trees. The similarity-degree calculating unit 14 calculates the degree of similarity between the above-described trees in accordance with the degree of matching between partial trees that are included in each of the above-described generated trees. On the basis of the above-described calculated degree of similarity, the classifying unit 16 classifies the above-described trees into groups that are made up of trees with a high degree of similarity that is described above. The representative-tree generating unit 15 generates, as a representative tree, one or more partial trees (e.g., common partial trees in the same group), which represent characteristics of each group, for each of the groups that are obtained during the above-described classification. In the access classifying device 10, the classifying unit 16 may classify the above-described accesses in accordance with the degree of similarity between the above-described representative tree and the above-described access.

In other words, the access classifying device 10 classifies a sequence of accesses, including automated transfer, to a server. Thus, even if there is a malicious website that automatically transfers an access from a user terminal to a web server and attacks vulnerability of a browser or a plug-in at the website, which is a transfer destination, so as to cause download of malware, the access classifying device 10 may discriminate a malicious website on the basis of the characteristics of a redirection pattern. Therefore, the access classifying device 10 blocks user's accesses to a website that is determined to be malicious, thereby preventing malware infection for users before happens. As a result, it is possible to configure the malicious website discrimination technique that may make discrimination with one-time access without being likely to be affected due to changes in contents, or the like, by attackers.

In addition, the access classifying device 10 may discriminate malicious websites without relying on information, such as contents, URLs, or hosts, obtained from a server. Therefore, the access classifying device 10 may detect attacks on users via malicious websites even if the contents are modified, or URLs are intentionally changed. Thus, it is possible to discriminate malicious websites or detect attacks without being avoided by attackers.

(Access Classifying Program)

Figure 15:
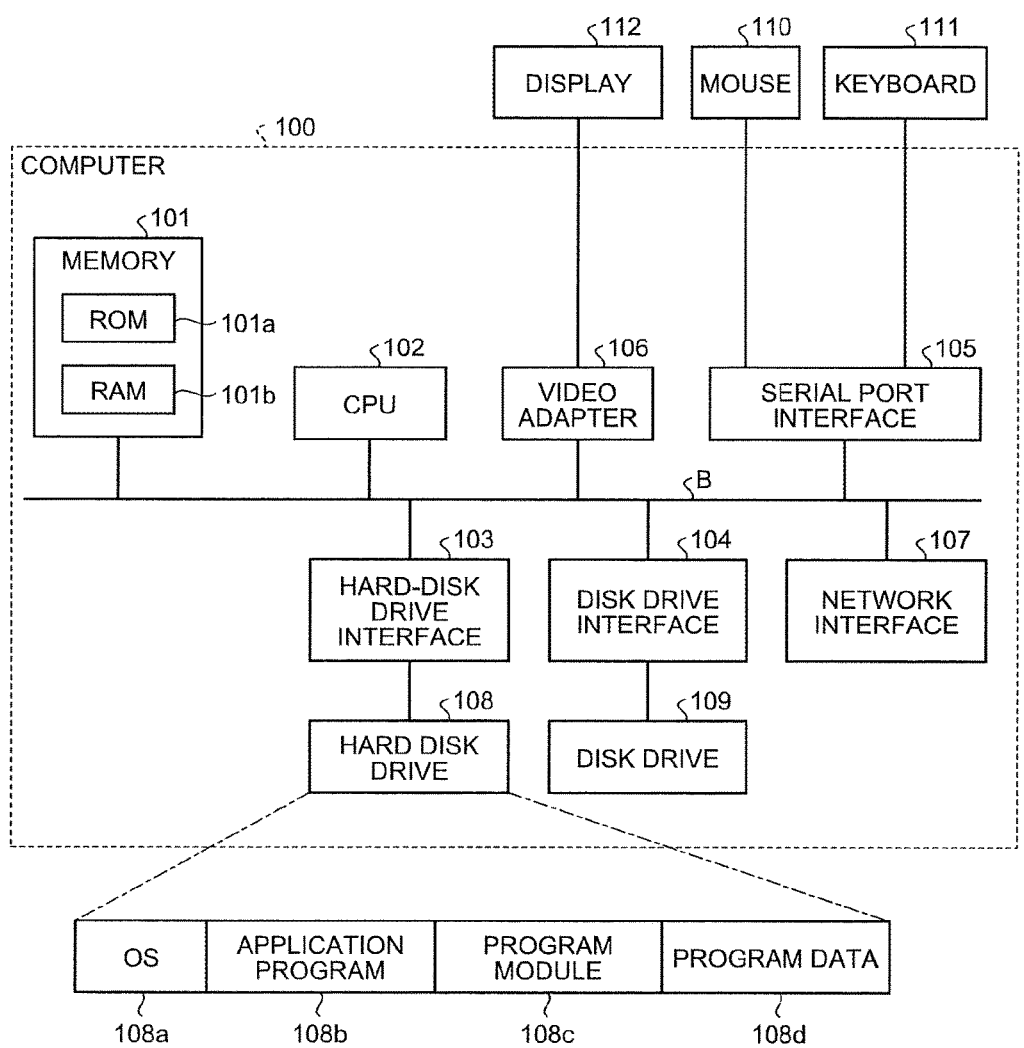
FIG. 15 is a diagram that illustrates specific implementation of information processing due to an access classifying program by using a computer.

FIG. 15 is a diagram that illustrates specific implementation of information processing due to the access classifying program by using a computer 100. As illustrated in FIG. 15, the computer 100 includes, for example, a memory 101, a CPU (Central Processing Unit) 102, a hard-disk drive interface 103, a disk drive interface 104, a serial port interface 105, a video adapter 106, and a network interface 107, and each of the units is connected via a bus B.

As illustrated in FIG. 15, the memory 101 includes a ROM (Read Only Memory) 101a and a RAM (Random Access Memory) 101b. The ROM 101a stores, for example, boot programs, such as BIOS (Basic Input Output System). As illustrated in FIG. 15, the hard-disk drive interface 103 is connected to the hard disk drive 108. As illustrated in FIG. 15, the disk drive interface 104 is connected to a disk drive 109. For example, a removable storage medium, such as a magnetic disk or an optical disk, is inserted into the disk drive 109. As illustrated in FIG. 15, the serial port interface 105 is connected to, for example, a mouse 110 or a keyboard 111. As illustrated in FIG. 15, the video adapter 106 is connected to for example the display 112.

Here, as illustrated in FIG. 15, the hard disk drive 108 stores, for example, an OS (Operating System) 108a, an application program 108b, a program module 108c, program data 108d, trees that include partial trees or representative trees, or access associated information. That is, the access classifying program according to the disclosed technology is stored in for example the hard disk drive 108 as the program module 108c that describes commands executed by the computer 100. Specifically, the hard disk drive 108 stores the program module 108c that describes various procedures for conducting the same information processing as each of the target-access input unit 11, the known-access input unit 12, the tree building unit 13, the similarity-degree calculating unit 14, the representative-tree generating unit 15, and the classifying unit 16, explained in the above-described embodiment. Furthermore, the data used during information processing due to the access classifying program is stored as the program data 108d in for example the hard disk drive 108. Furthermore, the CPU 102 reads the program module 108c or the program data 108d, stored in the hard disk drive 108, into the RAM 101b as needed and executes the above-described various procedures.

Furthermore, the program module 108c or the program data 108d according to the access classifying program may be not only stored in the hard disk drive 108 but also stored in for example a removable storage medium and be read by the CPU 102 via the disk drive 109, or the like. Alternatively, the program module 108c or the program data 108d according to the access classifying program may be stored in a different computer that is connected via a network (LAN (Local Area Network), WAN (Wide Area Network), or the like) and read by the CPU 102 via the network interface 107.

Furthermore, each component of the above-described access classifying device 10 does not necessarily need to be physically configured as illustrated in the drawings. Specifically, specific forms of separation and combination of each device are not limited to those depicted in the drawings, and a configuration may be such that all or some of them are functionally or physically separated or combined in an arbitrary unit depending on various types of loads or usage. For example, with regard to the access classifying device 10, the target-access input unit 11 and the known-access input unit 12 or the similarity-degree calculating unit 14 and the representative-tree generating unit 15 may be combined as a single component. Conversely, with regard to the classifying unit 16, it may be divided into a unit that classifies an access and a unit that classifies trees into a group. Furthermore, the hard disk drive 108, which stores trees, including partial trees or representative trees, access associated information, or the like, may be connected as an external device of the access classifying device 10 via a network or a cable.

REFERENCE SIGNS LIST

10 ACCESS CLASSIFYING DEVICE
11 TARGET-ACCESS INPUT UNIT
11a ANALYSIS-TARGET ACCESS
12 KNOWN-ACCESS INPUT UNIT
12a KNOWN ACCESS
13 TREE BUILDING UNIT
14 SIMILARITY-DEGREE CALCULATING UNIT
15 REPRESENTATIVE-TREE GENERATING UNIT
16 CLASSIFYING UNIT
100 COMPUTER
101 MEMORY
101a ROM
101b RAM
102 CPU
103 HARD-DISK DRIVE INTERFACE
104 DISK DRIVE INTERFACE
105 SERIAL PORT INTERFACE
106 VIDEO ADAPTER
107 NETWORK INTERFACE
108 HARD DISK DRIVE
108a OS
108b APPLICATION PROGRAM
108c PROGRAM MODULE
108d PROGRAM DATA
109 DISK DRIVE
110 MOUSE
111 KEYBOARD
112 DISPLAY
B BUS
C1 to C5, C1' to C3', C1", C2" GROUP
E1 to E6 EDGE
N1 to N8 NODE
T1, T2, T5, T6, T11 to T15 TREE
T3, T7 COMMON PARTIAL TREE
T4 ENTIRE PARTIAL TREE
T8 COMMON TREE
T9 REPRESENTATIVE TREE

The invention claimed is:

1. An access classifying device comprising processing circuitry configured to:
generate multiple trees, in which at least a first server and a second server are nodes and a command for transferring an access from the first server to the second server is an edge;
calculate a degree of similarity between the trees in accordance with a degree of matching between partial trees included in each of the trees generated; and
classify the access in accordance with the degree of similarity calculated.

2. The access classifying device according to claim 1, wherein the processing circuitry calculates, as the degree of similarity, a percentage of a number of partial trees, which are common to the trees, to a number of all partial trees included in the trees.

3. The access classifying device according to claim 1, wherein the processing circuitry calculates, as the degree of similarity, a number of partial trees that are common to the trees.

4. The access classifying device according to claim 1, wherein the processing circuitry calculates, as the degree of similarity, a number of nodes of a partial tree, which has a largest number of nodes, among partial trees that are common to the trees.

5. The access classifying device according to claim 1, wherein the processing circuitry uses the degree of similarity to calculate an inner-product value in a space of feature values of the trees, thereby classifying the access.

6. An access classifying device comprising processing circuitry configured to:
generate multiple trees, in which at least a first server and a second server are nodes and a command for transferring an access from the first server to the second server is an edge;

calculate a degree of similarity between the trees in accordance with a degree of matching between partial trees included in each of the trees generated;

classify the trees into multiple groups that are made up of trees, between which the degree of similarity is high, in accordance with the degree of similarity calculated; and generate a partial tree that represents a characteristic of each group as a representative tree for each group that is obtained during the classifying.

7. The access classifying device according to claim 6, wherein the processing circuitry classifies the access in accordance with the degree of similarity between the representative tree and the access to a server.

8. An access classifying method comprising:

a generating step of generating multiple trees, in which at least a first server and a second server are nodes and a command for transferring an access from the first server to the second server is an edge;

a calculating step of calculating a degree of similarity between the trees in accordance with a degree of matching between partial trees included in each of the trees generated; and a classifying step of classifying the access in accordance with the degree of similarity calculated.

9. An access classifying method comprising:

a tree generating step of generating multiple trees, in which at least a first server and a second server are nodes and a command for transferring an access from the first server to the second server is an edge;

a calculating step of calculating a degree of similarity between the trees in accordance with a degree of matching between partial trees included in each of the trees generated;

a classifying step of classifying the trees into multiple groups that are made up of trees, between which the degree of similarity is high, in accordance with the degree of similarity calculated; and a representative-tree generating step of generating a partial tree that represents a characteristic of each group as a representative tree for each group that is obtained during the classifying.

10. A non-transitory computer-readable recording medium having stored an access classifying program causing a computer to execute a process comprising:

a generating step of generating multiple trees, in which at least a first server and a second server are nodes and a command for transferring an access from the first server to the second server is an edge;

a calculating step of calculating a degree of similarity between the trees in accordance with a degree of matching between partial trees included in each of the trees generated; and a classifying step of classifying the access in accordance with the degree of similarity calculated.

11. A non-transitory computer-readable recording medium having stored an access classifying program causing a computer to execute a process comprising:

a tree generating step of generating multiple trees, in which at least a first server and a second server are nodes and a command for transferring an access from the first server to the second server is an edge;

a calculating step of calculating a degree of similarity between the trees in accordance with a degree of matching between partial trees included in each of the trees generated;

a classifying step of classifying the trees into multiple groups that are made up of trees, between which the degree of similarity is high, in accordance with the degree of similarity calculated; and a representative-tree generating step of generating a partial tree that represents a characteristic of each group as a representative tree for each group that is obtained during the classifying.

* * * * *